United States Patent Office

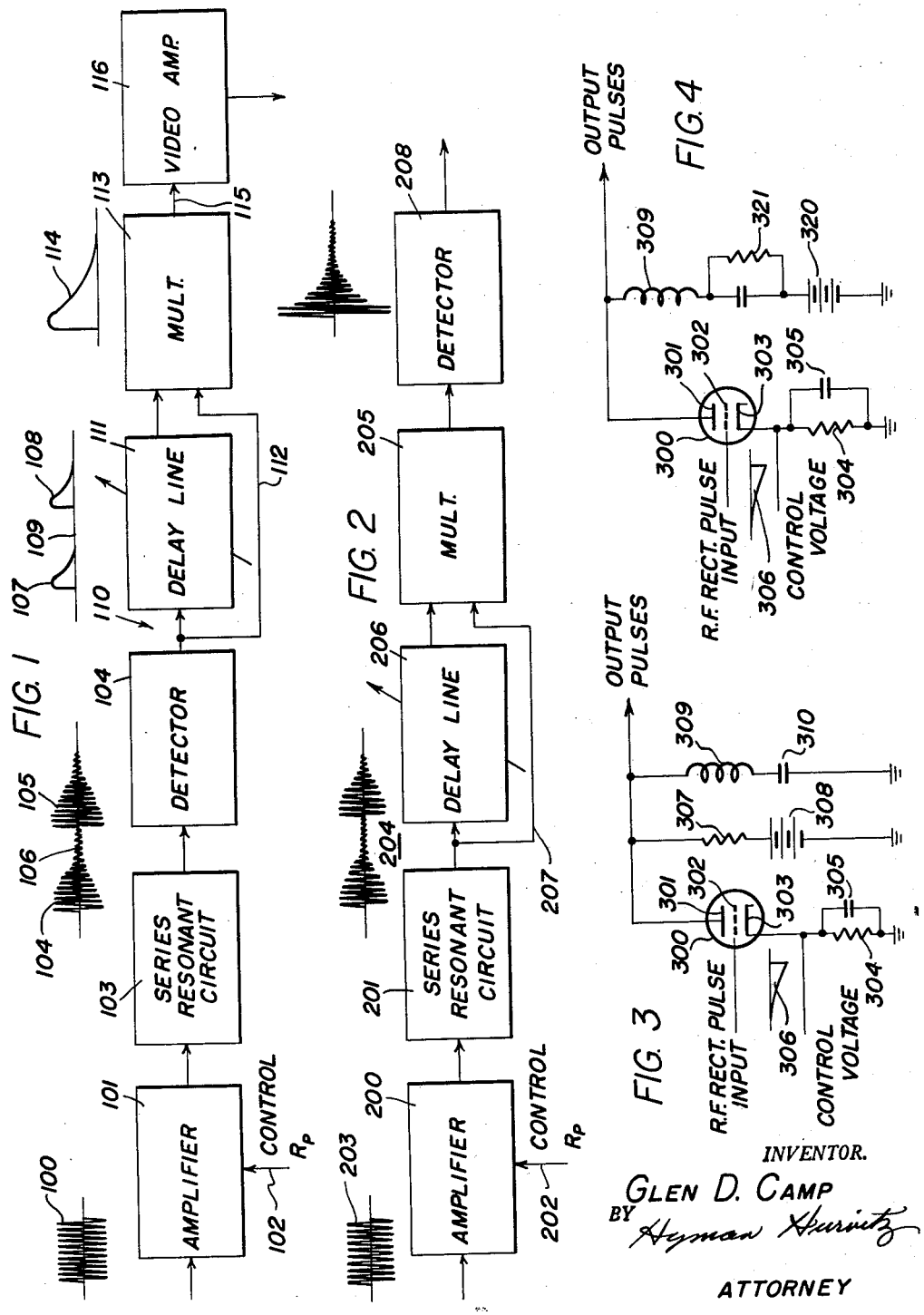

2,926,243
Patented Feb. 23, 1960

2,926,243

DISTANCE MEASURING SYSTEMS

Glen D. Camp, Chevy Chase, Md., assignor to Melpar, Inc., Alexandria, Va., a corporation of New York Original application December 11, 1951, Serial No. 261,121. Divided and this application November 30, 1955, Serial No. 557,625

8 Claims. (Cl. 250—27)

This application is a continuation-in-part of my application Serial Number 255,403, filed November 8, 1951, and entitled Signal Discrimination in Pulse Radar Systems, now U.S. Patent No. 2,726,386, issued December 6, 1955, and a division of my U.S. Patent No. 2,823,375, issued February 11, 1958, entitled Distance Measuring Systems With Compressed Returned Pulses.

In my prior applications, I disclosed the theoretical considerations which led to the conclusion that pulse radar systems could be materially improved in respect to ratio of desired to undesired signals, by providing for compression of received radar pulses as a function of range of the target from which the pulses are reflected. In those applications I disclosed a radar system in which the transmitted pulses were of non-rectangular form, and in particular were pulses having a relatively slowly attenuating form. It appears, however, that the practical difficulties in the way of producing the required pulses, in the powers required for some radar applications, are considerable, since pulses of the required shapes are not attainable from pulse magnetrons of conventional character.

It is an object of the present invention to provide a system of pulse shortening accomplished by shock exciting a series tuned circuit in response to each pulse, to derive a pair of attenuating pulses therefrom, and in which the attenuating pulses are combined in a mode which is discriminatory against noise.

A further object of the invention resides in the provision of novel pulse shortening techniques.

Another object of the invention resides in the provision of novel noise discriminatory techniques in pulse radar receivers.

The above and still further objects, features and advantages of the invention will become apparent upon consideration of the following detailed description of preferred embodiments of the invention, especially when taken in conjunction with the accompanying drawings, wherein:

Figure 1 is a block diagram of a pulse compressor system;

Figure 2 is a block diagram of a modification of the pulse compressor system of Figure 1;

Figure 3 is a schematic circuit diagram of a shock excited pulse compressor component employed in the systems of Figures 1 and 2; and Figure 4 is a schematic circuit diagram of a modification of the system of Figure 3.

Briefly described, in accordance with the invention, the present system operates generally in accordance with the philosophy expressed in my prior patents, referred to hereinabove, except that rectangular pulses are transmitted instead of attenuating pulses. The pulses must then be compressed as a function of range from which the pulses are returned. To accomplish the latter function each R.F. pulse, whether at carrier or at intermediate frequency is caused to shock excite a series tuned circuit. To this end the received pulses, either before or after frequency conversion, are applied to the input circuit of an amplifier having a series resonant circuit in its output. This circuit is resonant to the pulse frequency $\omega_0$, and taken in series with the amplifier tube has a natural frequency $\omega_n$, which is almost but not quite equal to $\omega_0$. The series combination of $R_p$, the internal amplifier tube resistance, and the L and C of the tuned circuit, are selected to have a decrement such that when shock excited the shock excitation current will decay to $1/e$ of its peak value in a time much less than the duration of each rectangular pulse, $-e$ being the base of the natural logarithmic system.

When a pulse is first applied to the input circuit of the amplifier tube most of the pulse amplitude appears across the inductance L, since this element opposes any sudden change in current. This transient voltage then decays at a rate determined by the losses of the series circuit including $R_p$, L and C, plus any losses existing in the physical devices providing L and C. The steady state voltage existing across the L, C combination is quite small, and is dependent on R, the resistance of the coil or other inductive element which provides L, assuming a perfect or loss free condenser. To a first approximation R may be assumed to equal zero.

An equivalent series of events occurs in response to the termination of each rectangular pulse.

Roughly speaking, then, the voltage amplitude across L, C, and R (providing an impedance Z) first rises rapidly to a high peak value, then in a time of the order $$T' = \frac{2L}{R+R_p}$$

falls to a fraction $$\frac{R}{R+R_p}$$

of its input value. This low value continues until the input pulse terminates, and then a new and similar transient (phase excepted) again occurs.

Considering the first transient, as exemplary, the input pulse is taken as zero until time zero, and as $E \sin \omega_0 t$ thereafter, for the duration of the pulse. The voltage drop across Z is $$\frac{ER_p}{R+R_p}\left(\frac{\omega_0}{\omega_n}e^{-\alpha t}\sin \omega_n t\right)+\frac{ER}{R+R_p}\sin \omega_0 t$$

Here $\alpha$ is the decay constant of the total impedance $R+R_p$. By making $R_p$ large relative to R the transient term (first term) can be made to dominate the steady state term (second term) of the equation, sufficiently that for all practical purposes only the first term exists. We therefore have a damped pulsed with decay constant given by $$\frac{R+R_p}{2L}$$

and the time $T'$ can be varied at will by varying $R_p$.

The same analysis applies at the end of the pulse, and generally the analysis applies whether or not the input rectangular pulses are truly rectangular or not. To the extent that the corners of the rectangular pulses are rounded off, or to the extent that the rectangular pulses have finite rise times, the transient pulses generated will have lower peak values, but the above analysis will still hold.

To convert the double pulses, occurring at the beginnings and ends of the rectangular pulses, into single pulses the pulses are delayed by a time equal to pulse duration T of the rectangular pulses, and multiplication of delayed and undelayed pulses accomplished. This yields a new signal, equal to zero unless two multiplication factors are simultaneously available at the input of the multiplier. If desired, the pulses may be detected prior to multiplication. In either case each received rectangular pulse is compressed, and forms a single compressed pulse as a consequence of the above described operations.

I have explained in my prior patents, above referred to, on what basis the lengths of the compressed pulses may be selected, to accomplish improved radar operation, and therefore dispense with any duplication of this explanation in the present application, and with duplication of description of a radar system in which the present system may be employed.

Reference is now made to Figure 1 of the accompanying drawings, wherein is illustrated one embodiment of a pulse compressor arranged in accordance with the present invention. Input pulses, of substantially rectangular shape, as 100, are derived from the intermediate frequency amplifier of a radar receiver (not illustrated), and applied to an amplifier 101, having appropriate circuits for controlling the internal resistance of the amplifier in response to a control voltage applied via lead 102. The amplifier 101 has in its plate circuit a series resonant circuit 103, which sets up an attenuating train of pulses in response to both the initiation and determination of the pulse 100, these being illustrated at 104 and 105, and which sets up a low amplitude signal at the frequency of the pulse 100 in the time interval intermediate initiating and terminating attenuating trains. Voltage derived from across the series resonant circuit 103 is detected in a detector 104, producing in response to each initiating and terminating train 104, 105, a high D.C. peak as 107, 108, and producing in the intermediate time a very low level D.C. or detected component 109. The entire signal ensemble, consisting of the short pulse peaks 107, 108, and the intermediate low level signal 109, may be identified by the reference numeral 110. The pulse ensemble 110 is applied to the input of an adjustable delay line 111, having a normal delay equal to the duration of the original pulse 100. The pulse ensemble 110 is also applied without delay to a lead 112. The output of the delay line 111 and the signal available on the lead 112 are applied jointly to a multiplier 113, followed by a video amplifier 116 from which may be derived a single pulse 114 on an output lead 115.

It will be clear from the nature of multipliers, as 113, that no output can be derived except while two input signals are simultaneously impressed therein. Accordingly the leading pulse peak 107 passes directly to the multiplier 113 via the lead 112, but produces no output therefrom. This leading pulse peak 107 also passes to the multiplier via the delay line 111, and when it arrives at the multiplier 113 so also does the pulse peak 108 via the lead 112. Accordingly there is then available at the multiplier 113 a pair of pulses at its inputs, which can give rise to an output pulse. When the trailing pulse peak 108 arrives at the multiplier 113 via the lead 112, there is no further signal available to the multiplier 113, and accordingly the output of the multiplier 113 again drops to zero. Accordingly the delay line 111 and the associated multiplier 113 represents a device for combining the pulse peaks 107 and 108.

The use of the multiplier 113, fed by relatively delayed pulses, in addition to enabling the combination of two spaced pulses into a single desired pulse, has the further effect common to auto-correlators, that noise is discriminated against. Explaining this effect in a simple manner, noise is a random phenomenon, or consists of very short spikes occurring at random times. The net effect of multiplying two time extended noise signals, one of which has been delayed with respect to the other, thereafter integrating the result of the multiplication, is to produce a signal equal to zero, on a statistical basis. Integration, in the case of the system of Figure 1, occurs in the video amplifier of a radar receiver. It follows that the utilization of the pulse compressor of Figure 1 in a radar system, results not only in pulse compression, with consequent increase of desired signal to clutter signal ratio, but also in discrimination against noise accompanying the pulses or occurring intermediate the pulses, and which finds its source anywhere in the system prior to the output of the multiplier 113.

In Figure 2 of the accompanying drawings is illustrated a modification of the pulse compressor of Figure 1. The difference between the systems of Figures 1 and 2 is primarily that in the system of Figure 2 the quantities multiplied are at carrier frequencies, whereas in the system of Figure 1 the multiplied quantities are detected or D.C. pulse ensembles.

Referring now more particularly to the system of Figure 2 of the accompanying drawings, the reference numeral 200 represents an input amplifier, having in its output circuit a series resonant device, which may, for example, be comprised of an inductance and capacity in series, and the amplifier 200 is provided with a device for controlling its internal resistance, $R_p$, in response to a voltage applied to a lead 202. The pulse input to the amplifier 200 may be derived, for example, from the intermediate frequency amplifier of a radar receiver. The output of the resonant circuit, 201, is similar to the output of the corresponding resonant circuit in the embodiment of my invention illustrated in Figure 1 of the accompanying drawings, and consists of a pulse component at carrier frequency, which rises very rapidly in response to the initiation of the input pulse 203 of the amplifier 200, a corresponding pulse of high peak amplitude and attenuating characteristic in response to the termination of the input pulse 203, and a low level sinusoidal wave at carrier frequency in response to the intermediate portion of the pulse 203.

The two spaced pulses of high peak value and attenuating characteristic, separated by a low level signal may be identified by the reference numeral 204, and denominated a pulse ensemble.

The pulse ensemble 204 is applied to a multiplier 205 via an adjustable delay line 206 and directly via a lead 207. The resultant output of the multiplier 205 is then detected in a detector 208, and applied to the video amplifier of the radar receiver. Accordingly the system of Figure 2, as does the system of Figure 1, represents a pulse compressor.

Due to the use of a multiplying device 205 together with an integrator, represented in the case of Figure 2 by the detector 208, the advantages of auto-correlation technique are present in the compressor of Figure 2, so that the system not only provides improved signal-to-clutter ratio, but also improved signal-to-noise ratio for the overall system.

In the systems of Figures 1 and 2, the elements of the systems are conventional except for the shock excited amplifier-resonant circuit combination. Accordingly, two embodiments of shock excited devices suitable for use in the compressors of Figures 1 and 2 are represented in Figures 3 and 4 of the accompanying drawings.

Referring now more specifically to Figure 3 of the accompanying drawings, the reference numeral 300 represents a vacuum tube amplifier having a plate 301, a control electrode 302, and a cathode 303. It will be realized that while I have illustrated a vacuum tube 300 having a single grid, that multigrid tubes may be employed, or that in the alternative transistors may be employed if desired. Connected in the cathode lead of the triode 301 is a resistor 4, by-passed by a capacity 305 having an extremely low impedance to the carrier frequency of the signals applied to the input of the amplifier. Accordingly, the cathode 303 is at ground potential for radio frequencies, but by applying a relatively slowly varying D.C. to the cathode, there may be developed a voltage across the resistance 304, suitable for varying the internal resistance, $R_p$, of the tube 301. The internal resistance of the tube 301 is varied in response to a sawtooth voltage 306. It follows that the internal resistance, $R_p$, of the tube 300 is decreased as a function of increasing range from which return pulses may be expected, during the operation of a radar or distance measuring device.

Connected in the anode circuit of the tube 300, is a very high load resistance 307 in series with a B+ supply 308. It is essential that the load resistance 307 be very much higher in value than is the internal resistance, $R_p$, of the tube 300, for reasons that will appear as the description proceeds. Further connected between ground and the anode 301 of the tube 300 is a series resonant circuit consisting of an inductance 309 and a condenser 310. It may be assumed that the inductance 309 has some resistance, which may be represented by the letter R, but which is not illustrated in the drawings. The condenser 310 may, for all practical purposes, be assumed loss-free.

When a square wave carrier frequency pulse is applied to the control electrode 302 of the tube 300, the inductance 309 presents very high impedance to the initiation of the pulse, as it does also to the termination of the pulse. On the other hand, the condenser 310 is essentially a short circuit for very sharply rising signals or very sharply falling signals, and accordingly the voltage developed in the output circuit of the tube 300 is essentially that developed across the inductance 309, and has a very high value. This voltage then attenuates as an oscillation, having a frequency corresponding with the natural frequency, $\omega_n$, of the circuit including 309, 310 and the internal resistance, $R_p$ of the tube 300. The resistance of the plate load 307 was purposely selected to be very high, relative to $R_p$, whereby the effective total resistance in series with the series resonant circuit 309, 310 is in the internal resistance of the tube 300, and very little energy dissipates through the plate load resistance 307.

After the initial pulse has died out, as a logarithmically attenuating function, the series circuit 309, 310 is driven at the frequency of the R.F. pulse, $\omega_o$, which is slightly different than the natural frequency of the entire circuit, $\omega_n$. However, the total steady state series impedance of inductance 309 and condenser 310 to the carrier frequency is extremely low, since the series circuit is resonant. Accordingly, most of the voltage available is taken up in the internal resistance, $R_p$, of the tube 300, and very little voltage appears across the output circuit. The voltage that does appear is the product of the current flowing, by the internal resistance of the inductance 309, hereinbefore represented as R.

Various forms of the circuit of Figure 3 have been devised, and I accordingly do not desire to be limited to any specific type of circuit. For example, the series circuit 309, 310 may take the form of a transmission line, it being well known that a quarter wave transmission line, open circuited at its output end, is equivalent to a series circuit as seen from its input end. Other equivalents, in the form of wave guide circuits and resonant cavities, are known to exist and may be substituted for the lumped circuit illustrated in Figure 3, without departing from the spirit of the invention.

Referring to Figure 4 of the accompanying drawings, there is shown a further modification of the system of Figure 3, employing lumped circuitry for purpose of illustration. In the system of Figure 4 the tube and its means for controlling the internal resistance, $R_p$, of the tube are identical with the corresponding elements of Figure 3. The sole distinction arises in the anode circuit of the tube. In the system of Figure 4 there is provided an inductance 309 and a condenser 310, which are in series, and which are series resonant to the applied carrier pulses, but these are taken in series with a B+ source 320. Across the condenser 310 is connected a very high resistance 321. The latter then provides a D.C. path for voltage applied to the anode 301 of the tube 300. However, when the circuit 309, 310 is oscillating, or is driven in response to the carrier pulse voltage, the condenser 310 represents an extremely low shunting impedance to the resistance 321, so that for carrier frequencies it may be assumed that the resistance 301 is absent from the circuit. The output voltages available from across the tuned circuit are then precisely the same as those present in the circuit of Figure 3, making allowance for the difference in location of the resistance 307 and the resistance 321 in the two cases, and for any differences in magnitudes of these resistances which may exist.

While I have described and illustrated various specific forms of the present invention, these represent preferred forms only, and I do not desire to be limited in respect to the breadth of my invention except as required by the scope of the appended claims.

What I claim and desire to secure by Letters Patent of the United States is:

1. A pulse compressor for radio frequency pulses of substantially rectangular shape, comprising, a series tuned circuit, means for exciting said series tuned circuit in response to said pulse, means for establishing a decay time for said series tuned circuit less than the interval of said pulse, means for deriving signal output from across said series tuned circuit, means delaying said signal output by a time equal to the duration of said pulse to provide a delayed signal output, and means for multiplying said signal output by said delayed signal output, to derive a resultant compressed pulse.

2. In a device for separating overlapping carrier signals of substantially rectangular shapes, the combination of a series resonant circuit, means for driving said series resonant circuit in response to said carrier signals, said last means having a considerably higher internal resistance than the internal resistance of said series resonant circuit, means for deriving time separated output signal pairs from across said series resonant circuit in response to each of said pulses, and means for combining said output signal pairs in time coincident relation.

3. A pulse compressor for radio frequency pulses of substantially rectangular shape, comprising, a series tuned circuit, means for applying said radio frequency pulses directly to said series tuned circuit, said series tuned circuit having a decay time less than the interval of said pulses, means for deriving a signal output across said series tuned circuit, means delaying said signal output by a time equal to the duration of said pulse to provide a delayed signal output and means for multiplying said signal output by said delayed signal output.

4. The combination according to claim 3 further comprising means for integrating the product produced by said means for multiplying.

5. In a radar system, means for receiving pulsed radio frequency carrier echo pulses of predetermined length and substantially rectangular shape, means for deriving a pair of pulsed radio frequency carrier pulses from each of said echo pulses, means for relatively delaying one of each pair of said last mentioned radio frequency carrier pulses into time coincidence with the other, means for multiplying the relatively delayed radio frequency carrier pulses each by the other, and means for integrating the product resultant of said means for multiplying.

6. In a device for separating overlapping carrier signal pulses of substantially rectangular shapes, means for generating first shortened carrier signal pulses in response to the initiations of said first mentioned carrier signal pulses and corresponding second shortened carrier signal pulses in response to the termination of said first mentioned carrier signal pulses, said first and second shortened carrier signal pulses being each shorter than said first mentioned carrier signal pulses, and means for converting said first and second shortened carrier signal pulses derived from each of said first mentioned carrier signal pulses into a single pulse, said last means including a signal amplitude multiplier responsive to said first and second shortened carrier signal pulses for multiplication each by the other.

7. The combination according to claim 6 wherein said means for generating first and second shortened carrier signal pulses comprises a series resonant device responsive to said first mentioned carrier signal pulses.

8. The combination according to claim 6 wherein said means for combining comprises a first channel and a second channel, means connecting said channels in parallel, said channels comprising means for differentially delaying signals therein by a time difference equal to the duration of each of said first mentioned carrier signal pulses to provide time coincidence of the differentially delayed signals, and means for voltage multiplying the outputs of said channels.

References Cited in the file of this patent

UNITED STATES PATENTS

| | | |
|---|---|---|
| 2,166,991 | Guanella | July 25, 1939 |
| 2,299,388 | Hansell | Oct. 20, 1942 |
| 2,418,127 | Labin | Apr. 1, 1947 |
| 2,426,187 | Earp | Aug. 26, 1947 |
| 2,484,352 | Miller et al. | Oct. 11, 1949 |
| 2,718,638 | De Rosa et al. | Sept. 20, 1955 |